US011482001B2

United States Patent
Deng et al.

(10) Patent No.: US 11,482,001 B2
(45) Date of Patent: Oct. 25, 2022

(54) IMAGE PROCESSING DEVICE, IMAGE PROCESSING METHOD, AND IMAGE PROCESSING SYSTEM

(71) Applicant: Hitachi, Ltd., Tokyo (JP)

(72) Inventors: Ziwei Deng, Tokyo (JP); Quan Kong, Tokyo (JP); Naoto Akira, Tokyo (JP); Tomokazu Murakami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/799,304

(22) Filed: Feb. 24, 2020

(65) Prior Publication Data

US 2020/0302173 A1 Sep. 24, 2020

(30) Foreign Application Priority Data

Mar. 20, 2019 (JP) .............................. JP2019-053015

(51) Int. Cl.
 *G06V 20/20* (2022.01)
 *G06K 9/62* (2022.01)
 *G06V 10/44* (2022.01)
 *G06V 10/22* (2022.01)

(52) U.S. Cl.
 CPC ........... *G06V 20/20* (2022.01); *G06K 9/6253* (2013.01); *G06V 10/235* (2022.01); *G06V 10/44* (2022.01)

(58) Field of Classification Search
 CPC ............. G06K 9/00671; G06K 9/2081; G06K 9/4604; G06K 9/6253
 See application file for complete search history.

(56) References Cited

U.S. PATENT DOCUMENTS

2008/0136820 A1* 6/2008 Yang ..................... G06T 7/194
 345/440
2015/0294476 A1* 10/2015 Tang ..................... G06T 7/187
 382/173
2017/0140236 A1 5/2017 Price et al.
(Continued)

FOREIGN PATENT DOCUMENTS

JP 2018-036852 A 3/2018
WO WO 2008/052226 A2 5/2008

OTHER PUBLICATIONS

Extended European Search Report, dated Jul. 28, 2020, for European Application No. 20156297.2.
(Continued)

*Primary Examiner* — Grace Q Li
(74) *Attorney, Agent, or Firm* — Baker Botts L.L.P.

(57) ABSTRACT

In a current image processing environment, providing feedback for a user operation is slow, and a user cannot confirm the result of the operation in real time. Thus, the user interrupts the operation every time the user confirms the feedback, and a time period for performing image processing is long.
An image processing device includes a guidance information generator. The guidance information generator acquires trajectory information to be used to segment an image object on an image input from a user, generates guidance information indicating a segmentation region desired by the user based on the trajectory information, and presents the segmentation region based on a user's intention in real-time. The guidance information generator provides a function of smoothly continuously segmenting an image object.

10 Claims, 15 Drawing Sheets

(56) References Cited

U.S. PATENT DOCUMENTS

2019/0050625 A1* 2/2019 Reinstein ............. G06K 9/4633
2019/0347804 A1* 11/2019 Kim .......................... G06T 7/11

OTHER PUBLICATIONS

Wang et al., "DeepIGeoS: A Deep Interactive Geodesic Framework for Medical Image Segmentation," Arxiv.org, Cornell University Library, 201 Olin Library Cornell University Ithaca, NY 14853, Jul. 3, 2017, XP081293067.
Notice of Reasons for Refusal, dated Mar. 8, 2022, for Japanese Application No. 2019-053015 (with English translation).

* cited by examiner

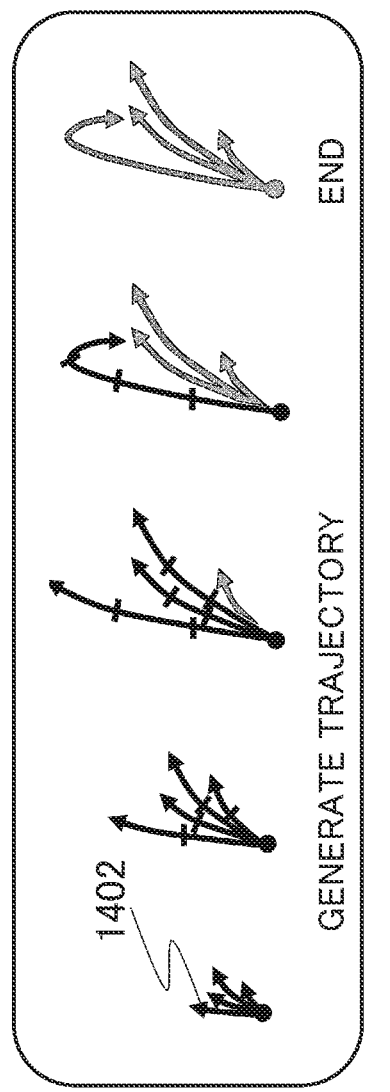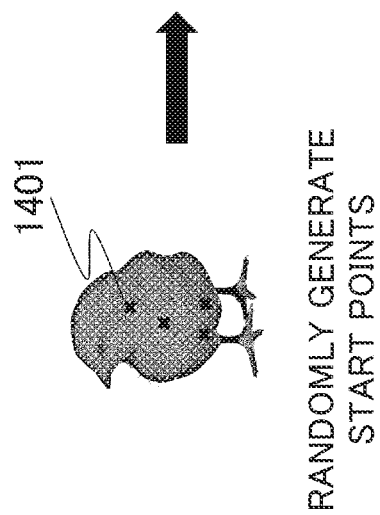

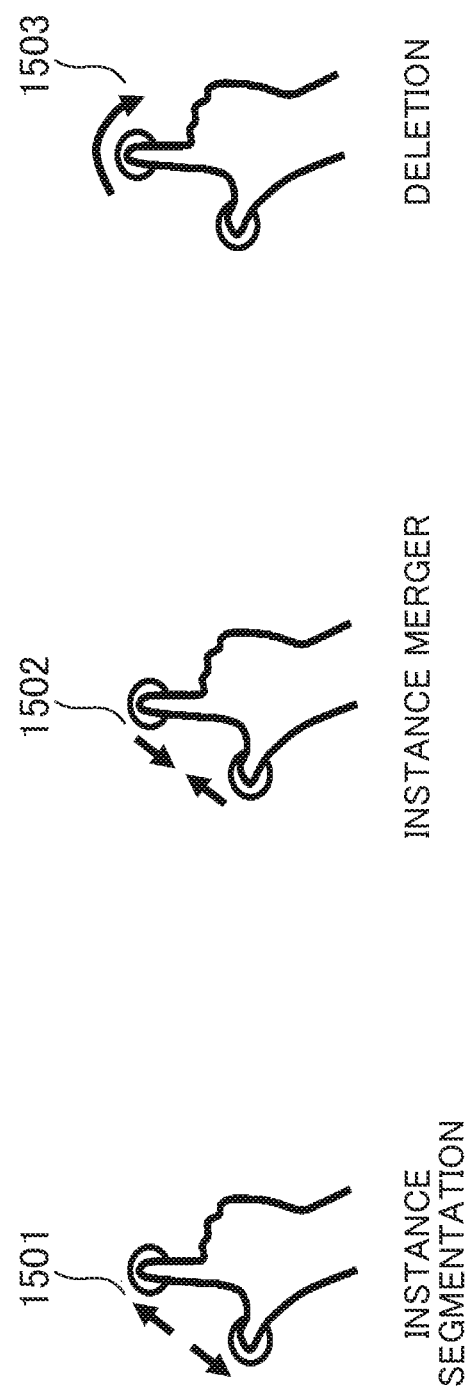

IMAGE PROCESSING DEVICE, IMAGE PROCESSING METHOD, AND IMAGE PROCESSING SYSTEM

CROSS-REFERENCE TO RELATED APPLICATIONS

The present application claims priority to Japanese Patent Application No. 2019-053015, filed Mar. 20, 2019. The contents of this application are incorporated herein by reference in their entirety.

BACKGROUND

The present invention relates to an image processing device, an image processing method, and an image processing system.

In recent years, with the progress of information technology (IT), many sensors are installed in societies and a large amount of data is accumulated. Under the circumstance, various measures to use accumulated image data are being considered. While the number of image contents such as pictures, video images, and images increases, there are increasing needs to freely identify objects within images and segment the objects from the background of the images or other objects.

Traditionally, to segment an object from an image, a certain method has been used. In this method, a user uses a pen, a finger or a pointing device such as a mouse to manually designate the outline of the object displayed on a display screen or a boundary between the object and another object.

However, in the method of segmenting the object by using the finger or the like to manually designate the outline of the object to be segmented, it takes time and effort for the user, and the accuracy of the segmentation result may be reduced due to an erroneous operation or the like. It is, therefore, requested to accurately designate a desired object without tracing the outline of the object and omit a user's time-consuming operation.

Under such circumstances, "semi-automatic object segmentation" for causing a computer to assist an object segmentation operation so as to omit a user's time-consuming operation has been developed.

For example, International Patent Application WO2008/052226A2 describes a technique in which "a system analyzes strokes input by a user on an iterative image segment in order to model a user's intention to refine segmentation, and in the user's intention model, colors of the strokes indicate user's prediction of changes in pixel labels with respect to the foreground or the background, the positions of the strokes indicate regions that the user is interested in, and relative positions of the strokes to a previous segmentation boundary indicate segmentation errors that the user is trying to adjust".

SUMMARY

The foregoing International Patent Application WO2008/052226A2 describes an image processing device that analyzes information such as colors and positions of strokes input by a user and a relative distance from a boundary of a previously segmentation region and predicts a segmentation result desired by the user.

In International Patent Application WO2008/052226A2, however, the segmentation region desired by the user is predicted using all strokes input to designate an object to be segmented based on a user's intention. Specifically, the segmentation region as feedback cannot be presented to the user during a stroke input to designate the object. Since providing the feedback to the user is slow, the user cannot see an operation result in real time and needs to interrupt the stroke input to designate the object in order to confirm the feedback.

Thus, the invention aims to provide a technique for smoothly designating an object by presenting a segmentation region (hereinafter also referred to as "segmentation result" or "segmentation plan") based on a user's intention even during a stroke input to designate the object.

To solve the foregoing problems, a representative one of image processing devices according to the invention generates segmentation region information desired by a user from trajectory information input by the user in order to designate an object to be segmented.

According to the invention, a segmentation region based on a user's intention can be provided. Challenges, configurations, and effects other than the foregoing are clarified by the following description of embodiments.

BRIEF DESCRIPTION OF THE DRAWINGS

FIG. 14 is a diagram depicting an example of user's input simulation according to the invention.

FIG. 15 is a diagram depicting an example of touch operations to be performed in the real-time object segmentation process according to the invention.

DETAILED DESCRIPTION

Figure 1:
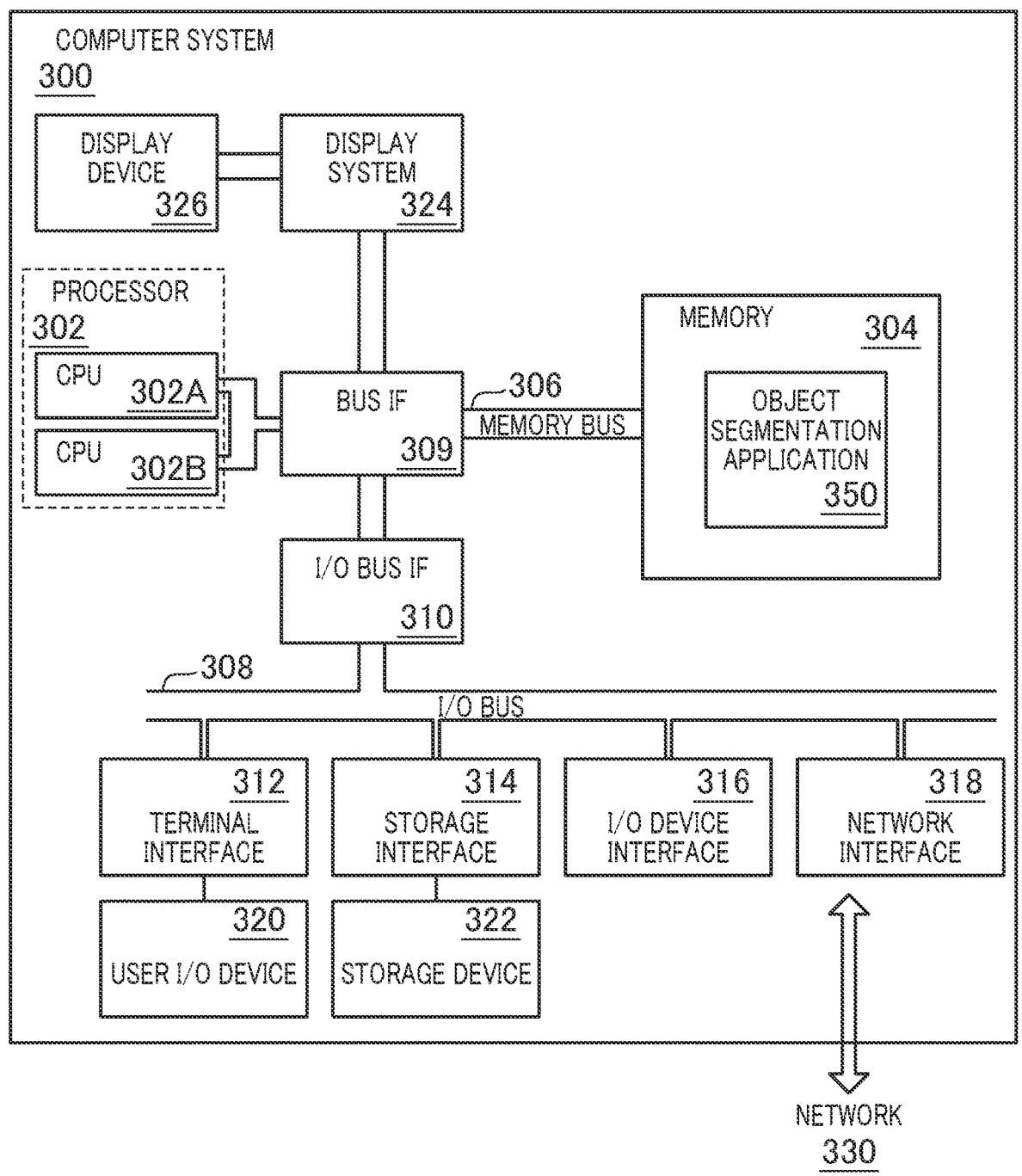
FIG. 1 is a block diagram depicting a computer system according to an embodiment of the invention.

Hereinafter, embodiments of the invention are described with reference to the accompanying drawings. The invention is not limited by the embodiments. In descriptions of the drawings, the same parts are indicated by the same reference symbols.

Hardware Configuration

Aspects of the present disclosure are described as sequences of operations to be executed by a computer device. In addition, various operations described in the present specification may be executed by a specific circuit (for example, a specific application integrated circuit (ASIC)), a program command executed by one or multiple processors, or a combination thereof. Furthermore, operational sequences described in the present specification may be stored as a set of computer commands in an arbitrary computer-readable storage medium. When each of the operational sequences is executed, a function corresponding to the operational sequence may be executed by a processor. Thus, various aspects of the present disclosure may be enabled in various forms. All the various aspects of the present disclosure are included in a technical range of the invention.

An aspect of an embodiment of the disclosure relates to a neural network. In general, the "neural network" is a calculation model having functions such as machine learning and pattern recognition. The neural network may be applied to various operational environments such as a local device, a server/client configuration, and a distributed network.

Next, a computer system 300 according to the embodiment of the disclosure is described with reference to FIG. 1. Mechanisms and devices according to various embodiments disclosed in the present specification may be applied to an arbitrary appropriate computing system. Main components of the computer system 300 include one or more processors 302, a memory 304, a terminal interface 312, a storage interface 314, an input/output (I/O) device interface 316, and a network interface 318. These components may be connected to each other via a memory bus 306, an I/O bus 308, a bus interface unit 309, and an I/O bus interface unit 310.

The computer system 300 may include one or more general-purpose programmable central processing units (CPUs) 302A and 302B that are collectively referred to as processor 302. In a certain embodiment, the computer system 300 may include multiple processors. In another embodiment, the computer system 300 may be a single-CPU computing system. The one or more processors 302 may execute a command stored in the memory 304 and include an on-board cache.

In a certain embodiment, the memory 304 may include a random-access semiconductor memory, a storage device, or a (volatile or nonvolatile) storage medium that stores data and a program. The memory 304 may store all or some of a program, a module, and a data structure that are used to enable functions described in the present specification. For example, the memory 304 may store an object segmentation application 350. In a certain embodiment, the object segmentation application 350 may include a command or description to execute the following functions in the processor 302.

In a certain embodiment, the object segmentation application 350 may be executed by hardware via a semiconductor device, a chip, a logical gate, a circuit, a circuit card, and/or another physical hardware device, instead of or as well as a processor-based system. In a certain embodiment, the object segmentation application 350 may include data other than the command or the description. In a certain embodiment, a camera, a sensor, or another data input device (not depicted) may be provided so that the camera, the sensor, or the other data input device directly communicates with the bus interface unit 309, the processor 302, or other hardware of the computer system 300.

The computer system 300 may include the bus interface unit 309 that communicates with the processor 302, the memory 304, a display system 324, and the I/O bus interface unit 310. The I/O bus interface unit 310 may be coupled to the I/O bus 308 to transfer data between the I/O bus interface unit 310 and various I/O units. The I/O bus interface unit 310 may communicate with the multiple interface units 312, 314, 316, and 318 that are known as I/O processors (IOPs) or I/O adapters (IOAs).

The display system 324 may include either or both of a display controller and a display memory. The display controller may provide either or both of video data and audio data to a display device 326. In addition, the computer system 300 may include one or multiple devices that are one or multiple sensors or the like and are configured to collect data and provide the data to the processor 302.

For example, the computer system 300 may include a biometric sensor for collecting heart rate data, stress level data, and the like, an environment sensor for collecting humidity data, temperature data, pressure data, and the like, and a motion sensor for collecting acceleration data, motion data, and the like. A sensor of a type other than the foregoing sensors may be used. The display system 324 may be connected to the display device 326 such as an independent display screen, a television, a tablet, or a mobile device.

Each of the I/O interface units has a function of communicating with various storage or various I/O devices. For example, a user I/O device 320 that is a user output device such as a video display device or a speaker television, a user input device such as a keyboard, a mouse, a keypad, a touchpad, a trackball, a button, a light pen, or another pointing device is attachable to the terminal interface unit 312. A user may use a user interface to operate the user input device and enter input data or an instruction into the user I/O device 320 and the computer system 300 and may receive output data from the computer system 300. The user interface may be displayed on the display device via the user I/O device 320, or reproduced by a speaker, or printed via a printer, for example.

One or multiple disk drives and a direct access storage device 322 (that is normally a magnetic disk drive storage device but may be a disk drive array configured to be seen as a single disk drive or may be another storage device) are attachable to the storage interface 314. In a certain embodiment, the storage device 322 may be implemented as an arbitrary secondary storage device. Details stored in the memory 304 may be stored in the storage device 322 and read from the storage device 322 when necessary. The I/O device interface 316 may provide an interface to another I/O device such as a printer or a facsimile machine. The network interface 318 may provide a communication path so that the computer system 300 and another device communicate with each other. The communication path may be a network 330, for example.

In a certain embodiment, the computer system 300 may be a device that receives a request from another computer system (client), which is a multi-user mainframe computer system, a single-user system, a server computer, or the like and does not have a direct user interface. In another embodiment, the computer system 300 may be a desktop computer, a mobile computer, a laptop computer, a tablet computer, a pocket computer, a phone, a smartphone, or another arbitrary appropriate electronic device.

First Embodiment

Next, a first embodiment of the invention is described. The invention relates to a process of accurately segmenting an image object using trajectory information included in a part of a stroke input by a user in an image editing environment.

In the present specification, a "stroke" indicates an operation of designating a "line" that is indicated by a user using a finger, a pen, or a pointing device such as a mouse and connects two points to each other on an image.

According to the invention, it is possible to analyze position information and direction information of a part of a stroke input by the user or, for example, a stroke segment input for a certain time period of 5 milliseconds or the like, thereby predicting an intention that indicates how the user wants to segment an image object and generating a segmentation region based on the user's intention.

Thus, effects of analyzing many stroke segments included in a stroke input by the user in real time and continuously presenting a segmentation region to improve the accuracy of object segmentation and reduce a time period for a user's operation can be obtained.

Next, a configuration of a real-time object segmentation system 200 according to the invention is described with reference to FIG. 2.

Figure 2:
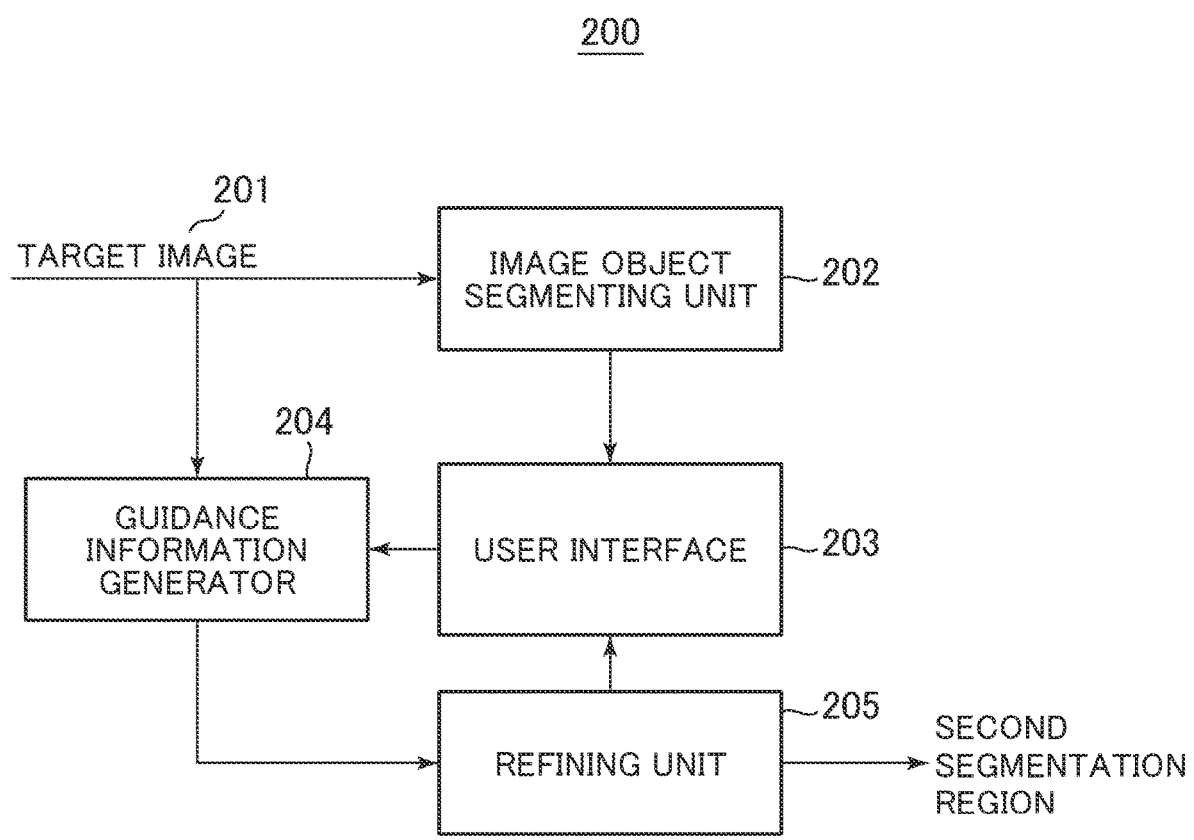
FIG. 2 is a block diagram depicting an example of a configuration of a real-time object segmentation system according to the invention.

As depicted in FIG. 2, the real-time object segmentation system 200 according to the invention includes an image object segmenting unit 202 for generating a first segmentation region, a user interface 203, a guidance information generator 204 for generating guidance information from user's input, and a refining unit 205 for generating a second segmentation region based on the guidance information.

The image object segmenting unit 202 is a functional unit that generates a first segmentation region for a target image input by the user. The first segmentation region is initial feedback. For example, the image object segmenting unit 202 generates the first segmentation region using a known object segmentation algorithm such as a deep learning-based segmentation method, graph cut, progressive cut, a clustering method, or edge detection. The generated first segmentation region is presented to the user via the user interface 203.

Figure 10:
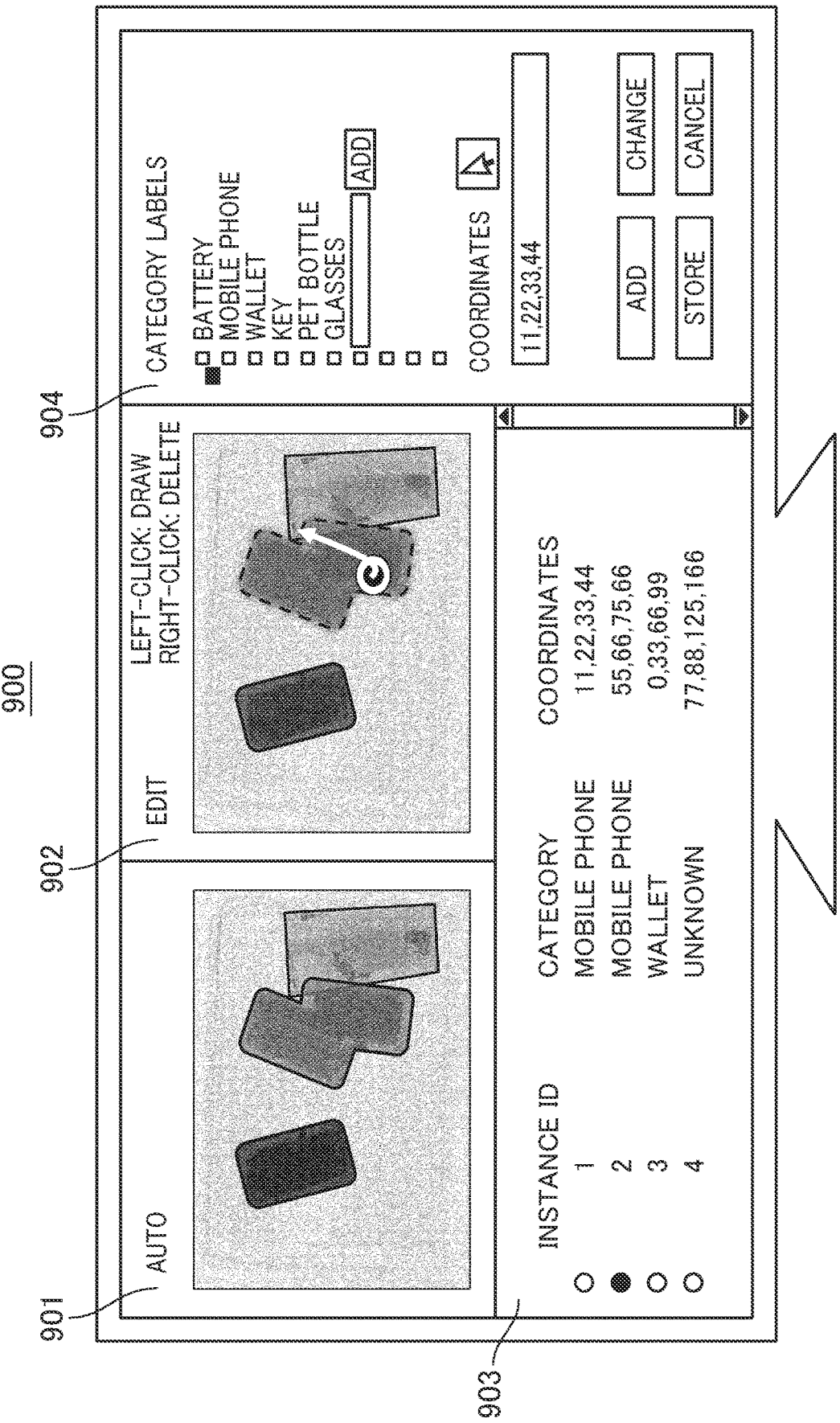
FIG. 10 is a diagram depicting an example of a user interface to be used to execute real-time object segmentation according to the invention.
Figure 11:
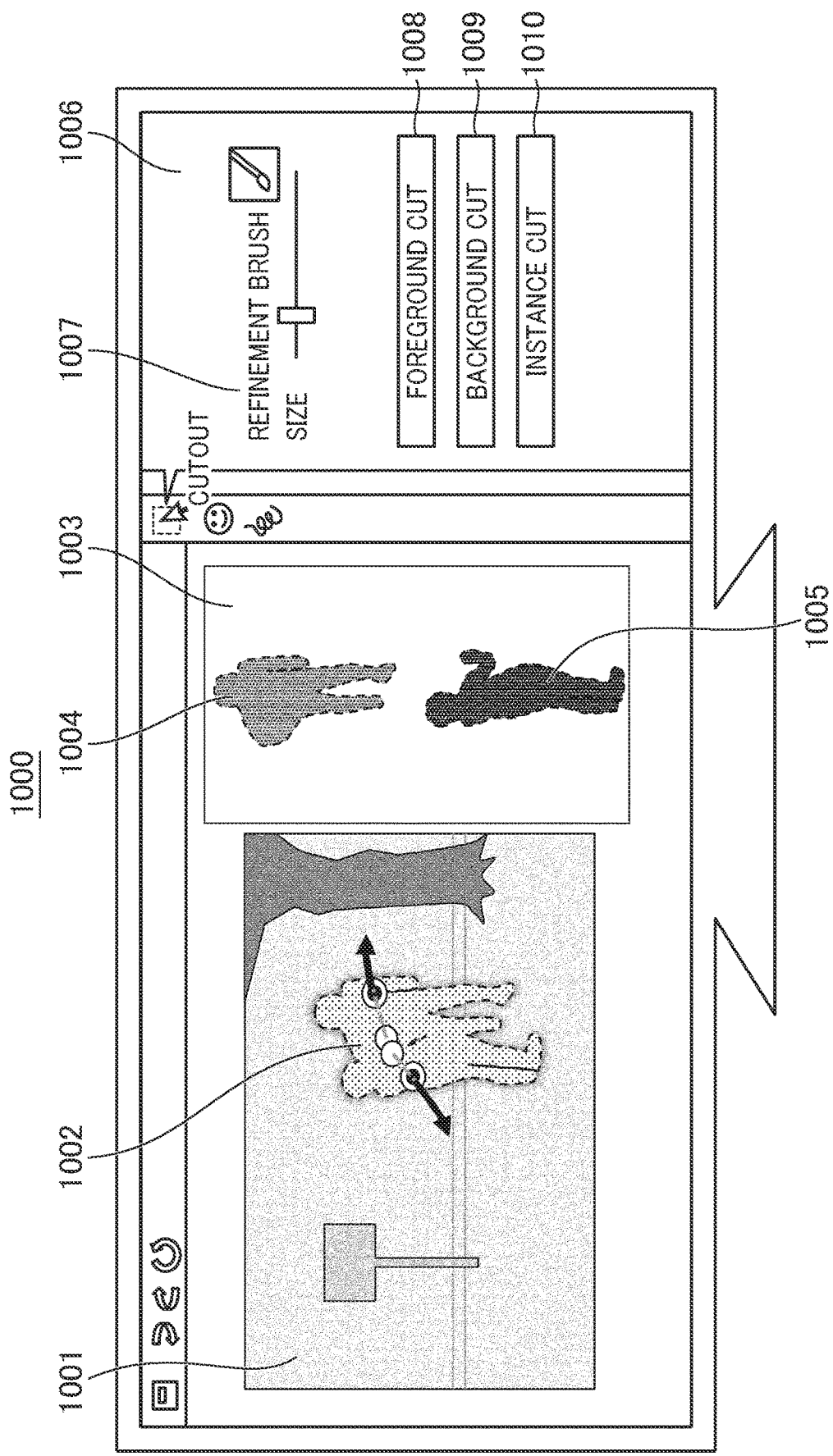
FIG. 11 is a diagram depicting an example of a user interface to be used to execute the real-time object segmentation according to the invention.

The user interface 203 is, for example, a GUI that is an operation screen created by an image editing program or the like and is used to transmit and receive information between the segmentation system 200 and the user (refer to, for example, FIGS. 10 and 11). The user may confirm the first segmentation region, enter evaluation (indicating whether the user accepts the first segmentation region) about the first segmentation region, and confirm a second segmentation region as feedback via the user interface 203.

For example, when an error (incorrectly segmented object or the like) exists in the first segmentation region, the user may use a finger, a pen, or a pointing device such as a mouse to input a stroke to refine the first segmentation region via the user interface 203.

The guidance information generator 204 is a functional unit that extracts trajectory information (position information and direction information) of a stroke segment included in the stroke input by the user via the user interface 203 and uses the extracted trajectory information and the target image to generate guidance information indicating how the user wants to segment an image object. The guidance information is described later in detail with reference to FIG. 8.

Although the configuration for analyzing stroke information on a stroke input by the user and executing a process of calculating trajectory information of the stroke by means of the guidance information generator 204 is described above, a configuration for executing a process of acquiring and analyzing stroke information on a stroke by means of the user interface 203 may be provided.

The refining unit 205 is a functional unit that uses the guidance information input from the guidance information generator 204 to generate a second segmentation region refined based on the user's input. The refining unit 205 may be an encoder-decoder network applied to image processing, object segmentation, and the like, for example. When the guidance information is input to the refining unit 205 from the guidance information generator 204, the refining unit 205 generates the second segmentation region and presents the generated second segmentation region to the user via the foregoing user interface 203. The second segmentation region is a segmentation result generated based on an intention predicted based on the stroke segment input by the user.

Although processes according to the invention are described using terms such as the "first segmentation region" and the "second segmentation region" in the present specification in order to distinguish the segmentation region before the refinement from the segmentation region after the refinement, this does not indicate that the number of segmentation regions is limited to two. In fact, three or more segmentation regions may be generated in real time during the time when the user edits the image.

The foregoing functional units of the real-time object segmentation system 200 according to the invention may be software modules forming the object segmentation application 350 depicted in FIG. 1 or may be independent dedicated hardware devices, for example.

In addition, the foregoing functional units may be enabled in the same computing environment or may be enabled in distributed computing environments. For example, the image object segmenting unit 202 may be implemented in a remote server, while the user interface 203, the guidance information generator 204, and the refining unit 205 may be implemented in a local device such as a client terminal. In another example, the image object segmenting unit 202 and the user interface 203 may be implemented in the client terminal, while the guidance information generator 204 and the refining unit 205 may be implemented in the remote server.

Figure 3:
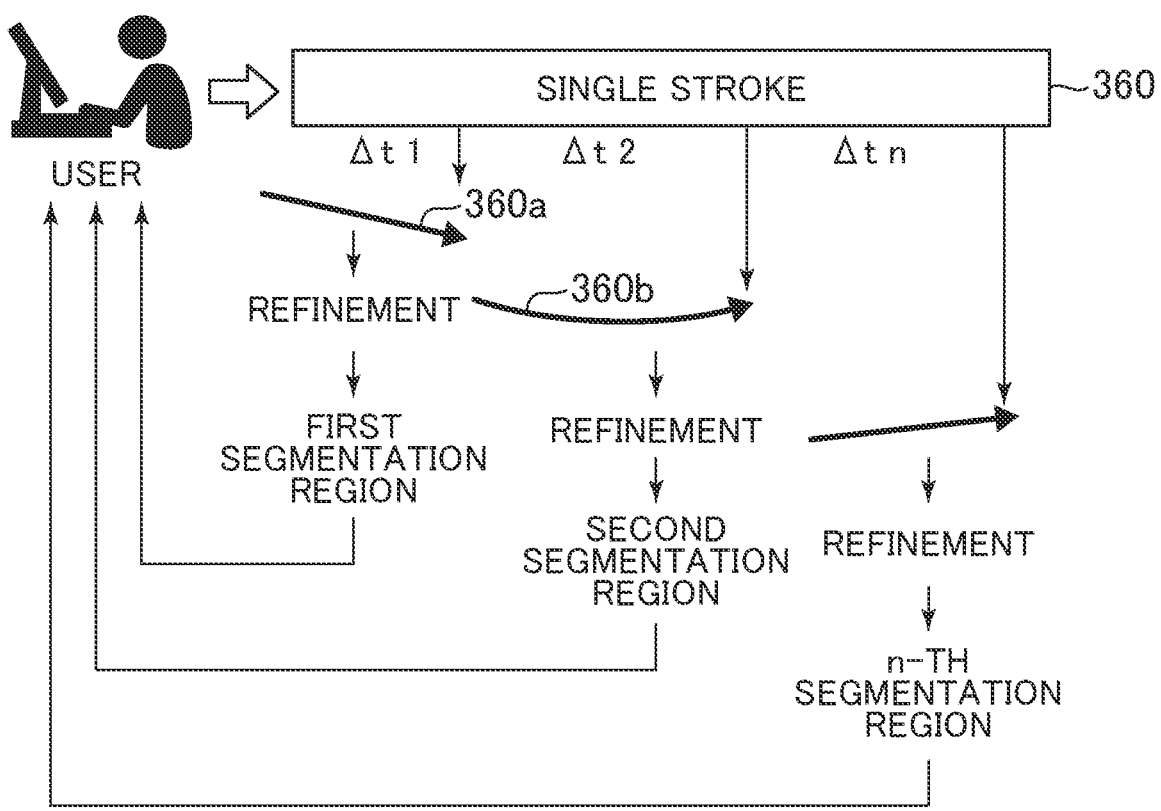
FIG. 3 is a diagram depicting an example of a temporal sequence of a real-time object segmentation process according to the invention.

Next, a real-time object segmentation process according to the invention is described based on a temporal sequence with reference to FIG. 3.

In an image object segmentation process, to acquire a highly accurate segmentation region, it is important to quickly visually feed a result of a user operation back to the user. In real-time object segmentation according to the invention, an objective is to use a stroke segment included in a stroke that is an editing operation by the user, predict a final segmentation region, and quickly feed the final segmentation region back to the user before the completion of the input of the stroke.

As depicted in FIG. 3, the foregoing object segmentation system reads a stroke segment 360*a* input for a time period Δt1 from the start of the input of a stroke 360 by the user to the time when a certain time period (of, for example, 5 milliseconds) elapses after the start of the input of the stroke 360. The stroke segment 360*a* is a part of the stroke 360. A first segmentation region is generated based on trajectory information indicated by the stroke segment 360*a* by a process described later and is fed back to the user.

Then, the user may change, based on the presented first segmentation region, a route (position and direction) of the stroke 360 from a stroke trajectory initially intended by the user in the middle of the stroke. When the user changes the route, the object segmentation system reads a stroke segment 360b input for a time period Δt2 from the end of the input of the stroke segment 360a to the time when a certain time period (of, for example, 5 milliseconds) elapses after the end of the input of the stroke segment 360a, like the foregoing process executed after the time period Δt1. After that, the object segmentation system refines the first segmentation region based on trajectory information of the stroke segment 360b to generate a second segmentation region indicating the refined segmentation region and presents the generated second segmentation region to the user. This process may be repeatedly executed a number n of times until the input of the stroke 360 is completed or until the user accepts the segmentation region.

Thus, the user can confirm the segmentation region serving as feedback in real time during the input of the stroke 360 by the user. Therefore, while confirming the feedback, the user can change the route of the stroke 360 during the input of the stroke 360, designate a desired segmentation region, and smoothly obtain a desired segmentation result.

Next, the real-time object segmentation process according to the invention is described with reference to FIG. 4.

First, in step S401, an image object segmenting unit (for example, the image object segmenting unit 202 depicted in FIG. 2) receives an input target image (for example, the target image 201 depicted in FIG. 2). The target image may be an image to be edited by the user in an image editing environment, for example.

Subsequently, in step S402, the image object segmenting unit generates a first segmentation region for the target image. Specifically, generating the first segmentation region indicates that a known algorithm such as a deep learning-based segmentation method, graph cut, progressive cut, a clustering method, or edge detection is used to detect an object included in the target image and group pixels belonging to the same object.

However, in the first segmentation region generated in the traditional segmentation method, objects included in the image may not be correctly grouped and an object that is not correctly segmented may remain with a high probability. Thus, the first segmentation region is a tentative result, and a highly accurate segmentation result can be obtained by refining the first segmentation region via an object segmentation method according to the invention.

Subsequently, in step S403, the first segmentation region generated in step S402 is presented to the user via a user interface (for example, the user interface 203). In this case, the user confirms the first segmentation region and determines whether image objects have been segmented based on a user's intention.

When the image objects have been segmented based on the user's intention, the user accepts the first segmentation region, which serves as a final segmentation result of the target image. After that, the process proceeds to step S410 (YES in step S403).

On the other hand, when the first segmentation region includes an object that has not been segmented based on the user's intention, the user does not accept the first segmentation region and the process proceeds to step S404 (NO in step S403).

Subsequently, in step S404, the user selects a target object to be refined in the first segmentation region. As described later, the target object may be selected by the user using a pen, a finger, or a pointing device such as a mouse to click on the target object in the first segmentation region displayed on a screen in the image editing environment, or designate coordinates of the target object, or select an instance associated with the target object, for example.

Subsequently, in step S405, the user uses the user interface to input a stroke indicating how the user wants to segment the target object selected in step S404. The stroke may be an operation of drawing a line using a mouse to designate an image region to be segmented or may be a swipe operation using a finger or a pen (stylus), for example. The stroke is not limited as long as the stroke is an operation of designating the image region to be segmented.

Subsequently, in step S406, a guidance information generator (for example, the guidance information generator 204 depicted in FIG. 2) reads a stroke segment input for a time period Δt from the start of the input of the stroke to the time when a certain time period (of, for example, 5 milliseconds) elapses after the start of the input of the stroke. The stroke segment is a part of the stroke.

Then, the guidance information generator extracts trajectory information of the stroke segment. After that, the guidance information generator uses the trajectory information and the target image to generate guidance information indicating how the user wants to segment the image objects (refer to FIG. 8 for details).

Subsequently, in step S407, a refining unit (for example, the refining unit 205 depicted in FIG. 2) refines the first segmentation region to generate a second segmentation region based on the guidance information generated in step S406 and presents the generated second segmentation region to the user via the user interface.

Subsequently, in step S408, the user confirms the segmentation region displayed on the user interface and determines whether the target object selected in step S404 has been segmented based on the user's intention.

When the target object has not been segmented based on the user's intention or another segmentation region desired to be refined exists, the user uses the user interface to provide an indication to that effect and the process returns to step S405.

When the selected target object has been segmented based on the user's intention, the user accepts the segmentation region of the target object and the process proceeds to step S409.

Subsequently, in step S409, the user determines whether another object for which the segmentation region is to be refined exists in the target image. When the user determines that the other object for which the segmentation region is to be refined exists in the target image (NO in step S409), the process returns to step S404.

When the user determines that the other object for which the segmentation region is to be refined does not exist in the target image (YES in step S409), the process proceeds to step S410.

Subsequently, in step S410, when a next target image exists, the process returns to step S401. When the next target image does not exist, the process is terminated.

As described above, in the real-time object segmentation process according to the invention, since the user can confirm a predicted operation result as feedback based on input (stroke or the like) of the user in real time, effects of improving the accuracy of the object segmentation and reducing a time period for a user operation can be obtained.

Next, a configuration of the guidance information generator 204 according to the invention is described with reference to FIG. 5.

As described above, the guidance information generator 204 receives user's input 501 such as a stroke indicating trajectory information and generates guidance information 508 based on the trajectory information, a target image 506, and a first segmentation region 507 generated by the image object segmenting unit (for example, the image object segmenting unit 202).

Figure 5:
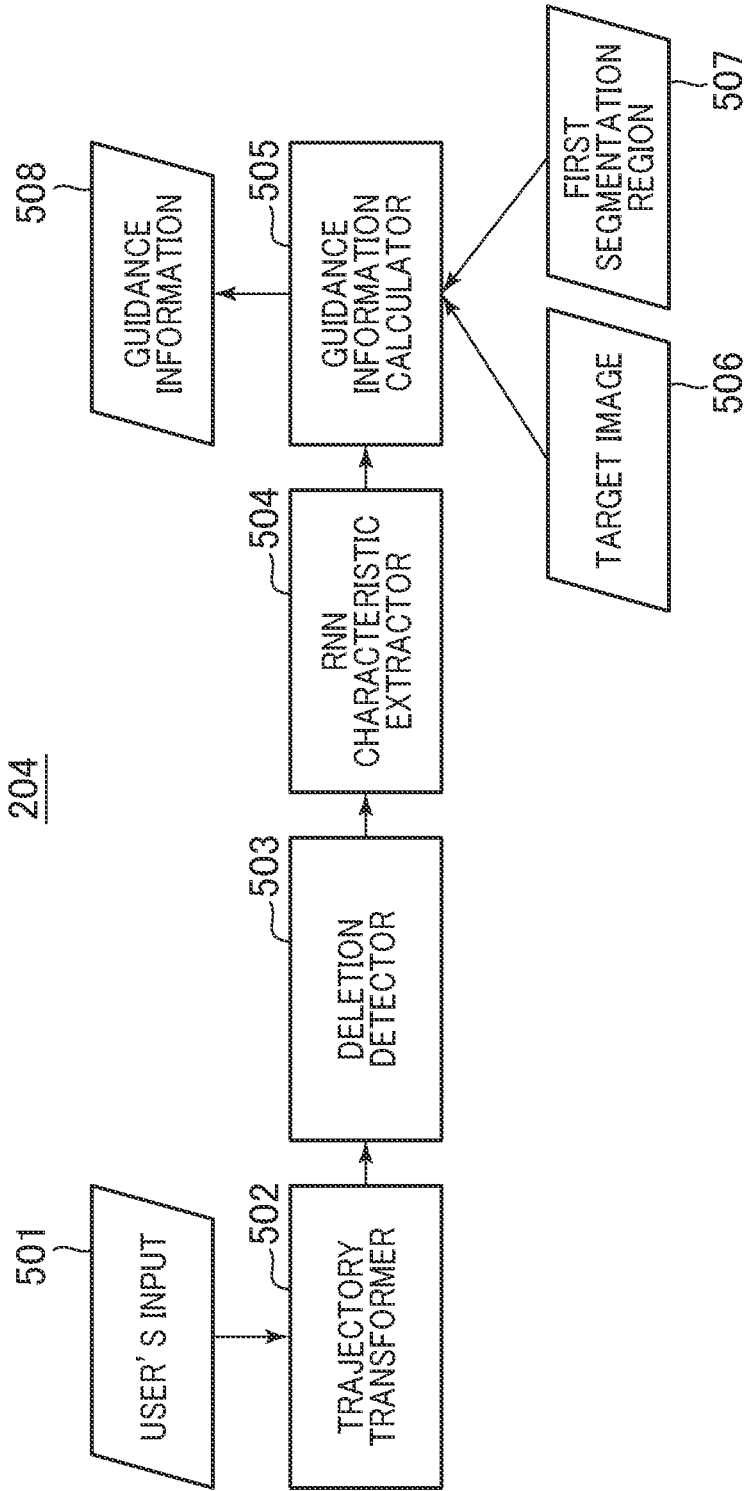
FIG. 5 is a diagram depicting an example of a configuration of a guidance information generator according to the invention.

As depicted in FIG. 5, the guidance information generator 204 according to the invention includes a trajectory transformer 502, a deletion detector 503, a recurrent neural network (RNN) characteristic extractor 504, and a guidance information calculator 505.

The trajectory transformer 502 is a functional unit that extracts the trajectory information included in the user's input 501 and generates a position map and a direction map based on the extracted trajectory information in a process described later. The position map is a matrix indicating pixels through which a route of a single stroke segment included in the stroke input by the user has passed on the target image.

The direction map is a matrix indicating a direction in which the route of the single stroke segment included in the stroke input by the user extends. The RNN characteristic extractor described later processes the position map and the direction map to predict a user's intention indicating how the user wants to segment an image object and generate an intention map indicating the predicted intention.

The deletion detector 503 is a functional unit that deletes a stroke segment previously input by the user and detects an intention of inputting stroke segments whose trajectory information is different for the stroke segments. Specifically, the deletion detector 503 compares chronologically continuous multiple position maps (for example, a position map corresponding to a time period Δt1 and a position map corresponding to a time period Δt2) with each other and calculates the Euclidean distance-based similarity between the two position maps.

In addition, the deletion detector 503 compares direction maps corresponding to the position maps used for the calculation of the similarity with each other and calculates a deviation of a route of the stroke.

When the similarity is equal to or higher than a predetermined similarity criterion (for example, 80%) and directions are determined to be substantially opposite (or satisfy a reverse criterion) to each other based on the foregoing calculation, the deletion detector 503 deletes the stroke segment previously input by the user and presents a final segmentation result. Since an intention indicating that the user wants to delete a stroke segment is automatically detected and a segmentation region is updated in real time, the user can easily correct an error caused by an erroneous operation or the like.

When the intention of the deletion is not detected, the output (position map and direction map) of the trajectory transformer 502 is directly given to the RNN characteristic extractor 504.

The RNN characteristic extractor 504 is a functional unit that predicts an intention indicating how the user wants to segment an image object, based on the position map and the direction map, which have been generated by the trajectory transformer 502, and generates an intention map indicating the predicted intention.

The RNN characteristic extractor 504 is, for example, a recursive model designed to recognize a pattern in ordered data such as chronological data and predicts data of a next pattern.

Figure 6:
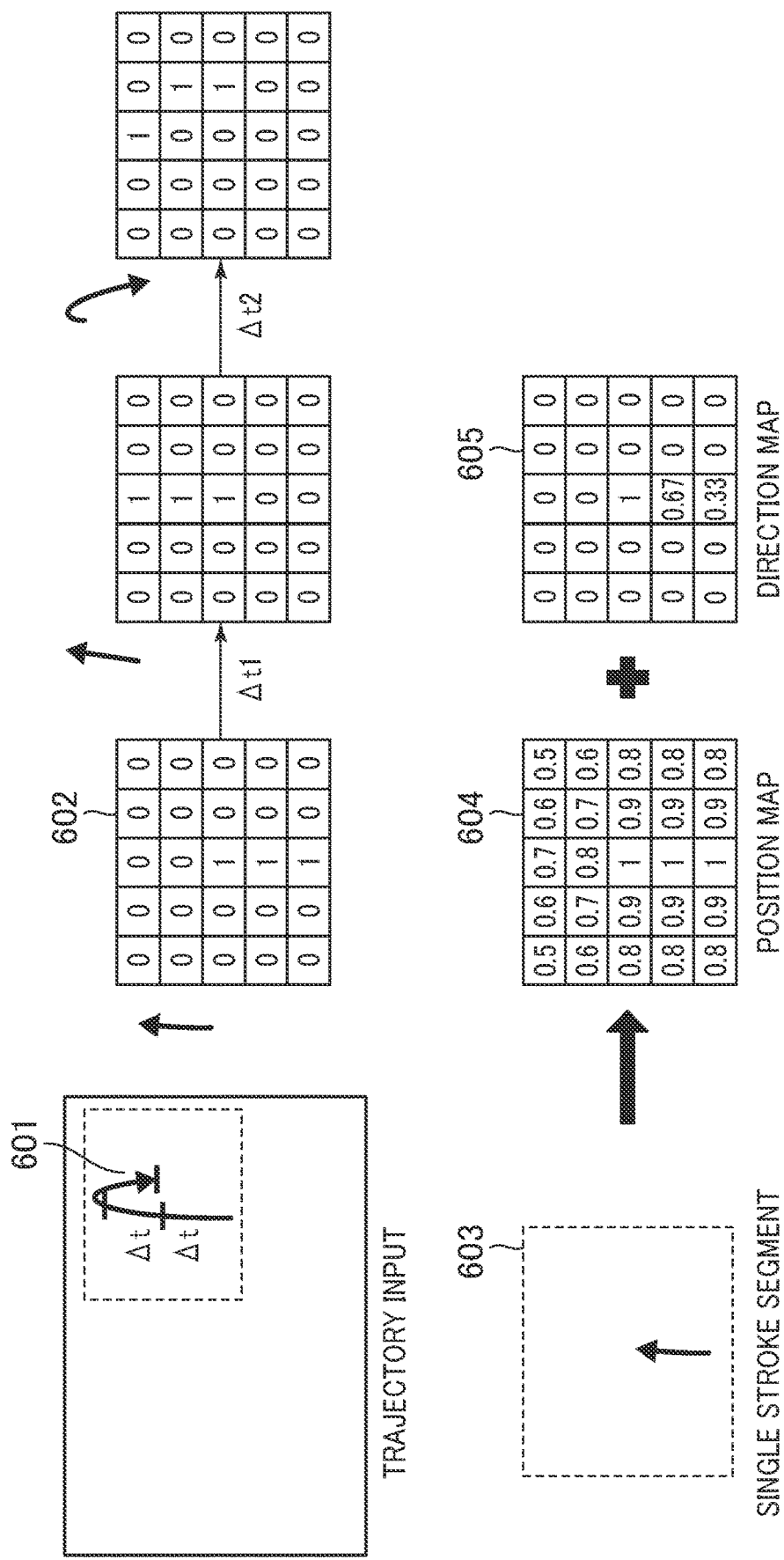
FIG. 6 is a diagram depicting an example of a process of calculating a position map and a direction map according to the invention.

As depicted in FIG. 6 described later, the RNN characteristic extractor 504 analyzes a position map and a direction map, which have been generated based on a stroke segment included in a stroke, predicts trajectory information of a next stroke segment, and generates an "intention map" indicating the predicted trajectory information.

The guidance information calculator 505 is a functional unit that merges the intention map (not exemplified) generated by the RNN characteristic extractor 504, the target image, and the first segmentation region to generate guidance information 508.

The guidance information 508 indicates a segmentation region predicted to be desired by the user. As described above, the refining unit (for example, the refining unit 205 depicted in FIG. 2) generates, based on the guidance information 508, a second segmentation region based on the predicted user's intention and presents the generated second segmentation region to enable the user to confirm the feedback in real time.

Next, a process of calculating position maps 604 and direction maps 605 according to the invention is described with reference to FIG. 6. As described above, a process of generating the position maps 604 and the direction maps 605 is executed by the trajectory transformer 502 depicted in FIG. 5.

As described above, first, the trajectory transformer extracts trajectory information 601 of stroke segments included in a stroke input by the user. After extracting the trajectory information 601, the trajectory transformer generates, as a two-dimensional matrix for each of the stroke segments, a position map 604 indicating position information of the stroke segment and a direction map 605 indicating direction information of the stroke segment.

The position maps 604 and the direction maps 605 have the same dimensions as a region 603 of a target image on which the stroke is input. Thus, pixels in the region 603 of the target image correspond to elements of matrices of the position maps 604 and the direction maps 605.

A value in each of the elements of the matrices of the position maps 604 indicates a probability with which a route of a stroke segment input by the user passes through a pixel corresponding to the element. An element of a position map 604 that corresponds to a pixel through which a route of a stroke segment has passed is set to "1".

To improve the robustness of the position map, values of other elements of a matrix are calculated using a Gaussian function expressed by the following Equation 1 and having a criterion deviation σ.

$$V_T(p) = \max_{0 \le n \le N}\left(\exp\left(-\frac{d(p, t_n)^2}{2\sigma^2}\right)\right), t_n \in T \quad \text{(Equation 1)}$$

In Equation 1, $V_T(P)$ is a probability value of a pixel p in a position map 604 generated based on a certain stroke segment T, N is the number of pixels through which a route of the stroke segment has passed, and $d(p, t_n)$ is the Euclidean distance between a point $t_n$ on the stroke segment T and the pixel p.

As described above, each of the direction maps 605 is a matrix indicating a direction in which a route of a stroke segment input by the user extends. An element of a direction map 605 that corresponds to a pixel that is an end point of a route of a stroke segment is set to "1". Other elements of the direction map 605 are calculated according to the following Equation 2.

$$D_T(p) = \begin{cases} S_e \dfrac{n}{N}, & p \in t_n \\ 0, & \text{others} \end{cases} \quad \text{(Equation 2)}$$

In Equation 2, $D_T(p)$ is a value of a pixel p in a direction map 605 generated based on a certain stroke segment T, n indicates that the pixel p on the stroke segment T is an n-th pixel from a start point of the stroke segment T, N is the number of pixels through which a route of the stroke segment has passed, and $S_e$ is a value of an end point of the stroke segment T. For example, when the pixel p on the stroke segment T that has passed through 3 pixels (or N=3) is the second pixel from the start point, n/N is 2/3 and $D_T(p)$ is 0.67.

Next, a process of generating an intention map 703 according to the invention is described with reference to FIG. 7. As described above, the process of generating the intention map 703 is executed by the RNN characteristic extractor depicted in FIG. 5.

The RNN characteristic extractor predicts trajectory information of a route of a stroke segment that may be input immediately after a stroke segment serving as a source of input $x_0$701 based on position maps and direction maps (represented as input $x_0$701 in this case) generated by the trajectory transformer 502. Then, the RNN characteristic extractor generates a probability distribution of the predicted trajectory information as an intention map (output $x_0$703 in this case). By executing this process on each segment included in a single stroke, multiple intentions corresponding to different time periods are generated.

Figure 7:
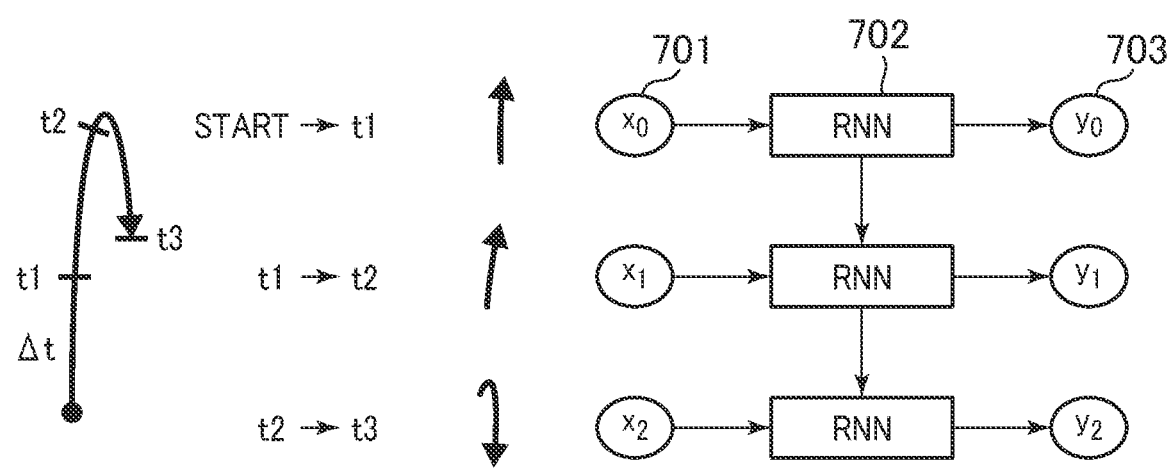
FIG. 7 is a diagram depicting an example of a process of generating an intention map according to the invention.

For example, as depicted in FIG. 7, the RNN characteristic extractor processes a stroke segment $x_0$ input for a time period from the time when a stroke is started to a time t1, a stroke segment $x_1$ input for a time period from the time t1 to a time t2, and a stroke segment $x_2$ input for a time period from the time t2 to a time t3, thereby generating 3 intention maps $y_0$, $y_1$, and $y_2$.

As described later, a segmentation region based on a user's intention can be generated based on the foregoing intention maps, the first segmentation region, and the target image.

Although the example in which the 3 intention maps are generated is described, the invention is not limited to this. The guidance information can be generated when at least one intention map exists.

Next, a configuration of guidance information 750 according to the invention is described with reference to FIG. 8. As described above, the guidance information 750 indicates a route to be traced by a user's stroke to obtain a segmentation result desired by the user.

Figure 8:
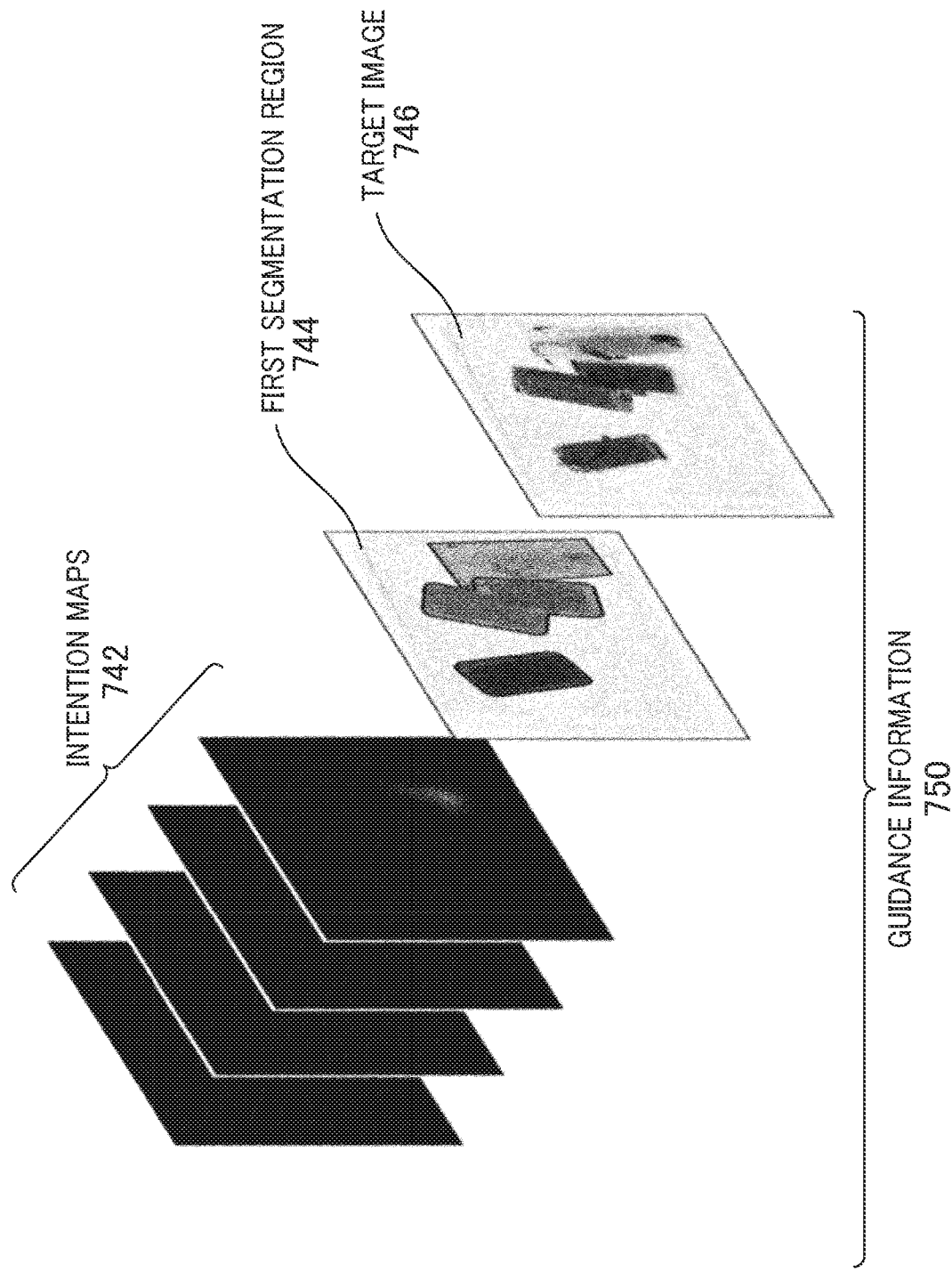
FIG. 8 is a diagram depicting an example of a configuration of guidance information according to the invention.

As depicted in FIG. 8, the guidance information 750 is generated based on one or more intention maps 742 generated based on a stroke segment, a first segmentation region 744 generated by the image object segmenting unit, and an original target image 746. The intention maps 742, the first segmentation region 744, and the target image 746 are transformed to the same dimensions (or state in which the numbers of pixel rows are the same and the numbers of pixel columns are the same) and superimposed on each other, the user's stroke is compared with the first segmentation region 744, and pixels through which the stroke may pass on the target image 746 are presented.

By using the guidance information 750 indicating the route predicted to be traced by the user's stroke, the foregoing refining unit can refine the first segmentation region to generate a second segmentation region based on a user's intention.

Figure 9:
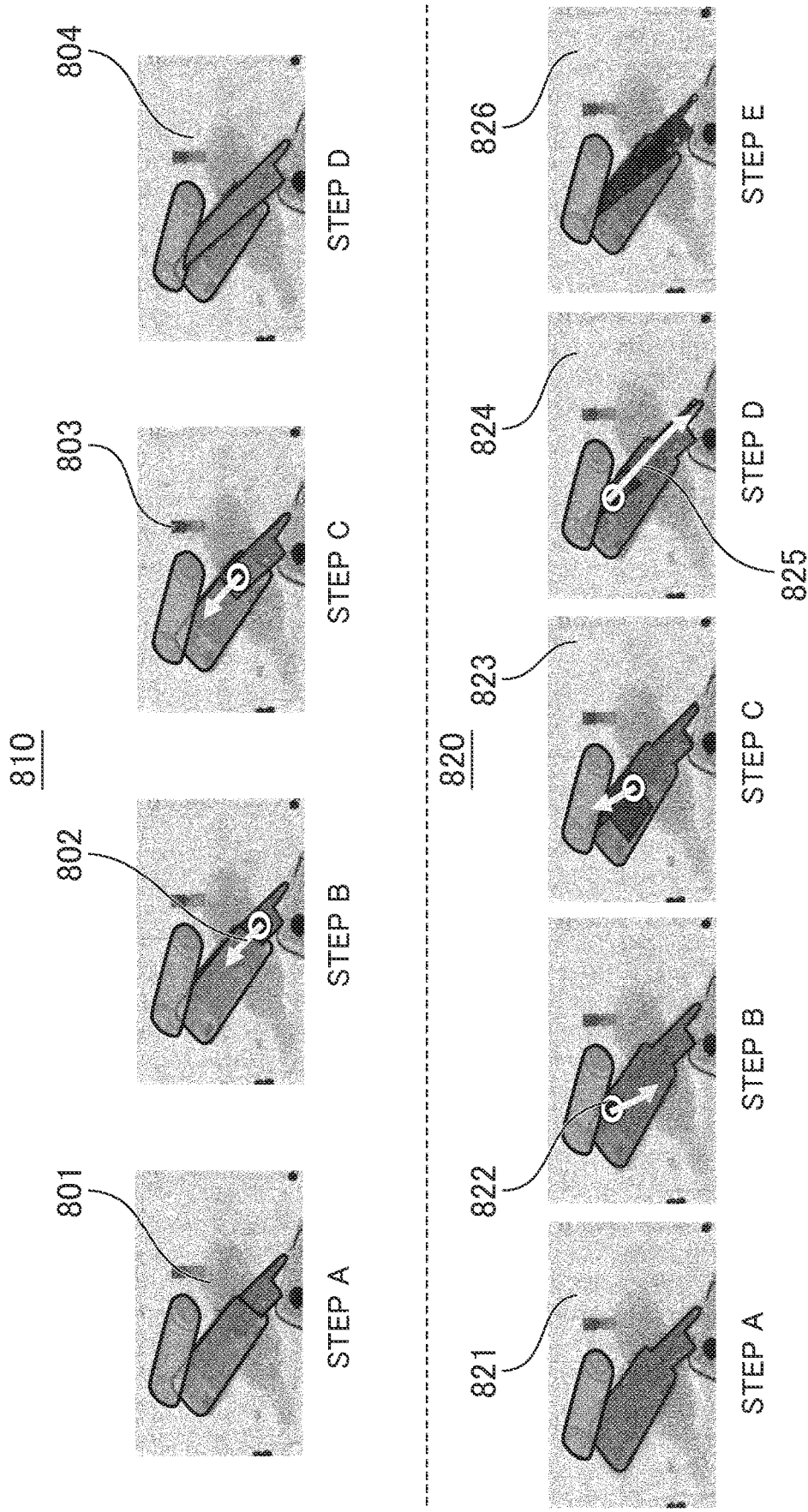
FIG. 9 is a diagram depicting an example of a drawing process and a deletion process according to the invention.

Next, a drawing process 810 according to the invention and a deletion process 820 according to the invention are described with reference to FIG. 9.

Grouping pixels belonging to the same object as an "object mask" on a target image is referred to as "object segmentation" and described above. In fact, however, a process of segmenting an object is composed of two processes, which are the "drawing process" 810 of causing pixels belonging to a target object to be included in the same group and the "deletion process" 820 of removing a pixel not belonging to the target object from the group.

The processes are described below using an example depicted in FIG. 9. A target image in which a knife, a mobile phone, and a spray partially overlap each other is described below as an example.

First, the drawing process 810 is described. In step A, the image object segmenting unit (for example, the image object segmenting unit 202 depicted in FIG. 2) processes the target image to provide a first segmentation region 801. An object mask of the knife is hidden by an object mask of the mobile phone in the first segmentation region 801. Thus, the first segmentation region 801 is not a segmentation result desired by the user, and the user does not accept the first segmentation region 801 (which corresponds to NO in step S403 depicted in FIG. 4).

Subsequently, in step B, the user inputs a stroke 802 extending from a start point on the object mask of the knife and passing through a region desired to be included in the object mask of the knife in order to refine the first segmentation region 801.

Subsequently, in step C, a second segmentation region 803 based on a stroke segment input for a time period Δt from the time when the stroke 802 is started to the time when a certain time period (of, for example, 5 milliseconds) elapses after the start of the stroke 802 is generated and presented to the user immediately after the start of the stroke 802.

However, since one or more of all pixels, which are desired by the user to be included in the object mask of the knife, are not included in the object mask of the knife in the second segmentation region 803, the user continuously inputs the stroke 802.

Subsequently, in step D, a third segmentation region 804 based on a stroke segment input by the user is generated and presented as feedback to the user. Since all the pixels desired by the user to be included in the object mask of the knife are included in the object mask of the knife in the third segmentation region 804, the user accepts the third segmentation region 804. After that, the third segmentation region 804 is output as a final result (final segmentation region).

Next, the deletion process 820 is described. In step A, a first segmentation region 821 in which an object mask of the knife is included in an object mask of the mobile phone is presented to the user. The object mask of the knife and the object mask of the mobile phone are mixed in the first segmentation region 821. Thus, the first segmentation region 821 is not a segmentation result desired by the user, and the user does not accept the first segmentation region 821 (which corresponds to NO in step S403 depicted in FIG. 4).

Subsequently, in step B, the user inputs a stroke 822 extending along a boundary between a region to be removed and a region not desired to be removed in the first segmentation region 821 as a refinement operation of removing the object mask of the knife from the object mask of the mobile phone.

Subsequently, in step C, a second segmentation region 823 based on the user's input performed in step B is generated and presented to the user. The second segmentation region 823 includes a region unnecessary for the object mask of the knife. To delete the unnecessary region, the user inputs a stroke extending toward a direction opposite to a direction toward which the stroke input in step B extends. As described above, a deletion detector (for example, the deletion detector 503 depicted in FIG. 5) determines that the input performed in step C indicates the deletion process, and the deletion detector deletes the unnecessary region included in the object mask of the knife.

Subsequently, in step D, a third segmentation region 824 from which the unnecessary region included in the object mask of the knife has been deleted is presented to the user. Then, the user inputs a stroke 825 extending from a start point on the object mask of the knife and passing through a region desired to be included in the object mask of the knife.

Subsequently, in step E, a fourth segmentation region 826 based on the user's input performed in step D is generated and presented as feedback to the user. Since the object mask of the knife and the object mask of the mobile phone are segmented in the fourth segmentation region 826 as desired by the user, the user accepts the fourth segmentation region 826. After that, the fourth segmentation region 826 is output as a final segmentation result.

Each of the "strokes" and the "stroke segments" is described above as an independent operation, but stroke segments may be continuously input as a single stroke without interruption of the input of the stroke segments.

Next, a user interface 900 to be used to execute the real-time object segmentation according to the invention is described with reference to FIG. 10. The user interface is, for example, a GUI to be used to tag an object included in an RGB image, an X-ray image, or the like in the image editing program.

As depicted in FIG. 10, the user interface 900 includes an automatic window 901, an image editing window 902, a tagging information window 903, and an information editing window 904. When a target image is read into the image editing program (for example, by user selection) (in step S401 depicted in FIG. 4), the foregoing first segmentation region is generated (in step S402 depicted in FIG. 4) and the automatic window 901 is presented. For example, the target image depicted in FIG. 10 is a captured X-ray image of 3 mobile phones and one wallet.

In the tagging information window 903, an instance ID, category, and coordinate information of an object in the target image are displayed. The user can select an instance of an object to be edited in the tagging information window 903 and edit detailed information of the selected object in the information editing window 904.

For example, in the information editing window 904, the user can select a category of an object, define a new category, and input coordinate information designating the position of an object in an image.

Figure 4:
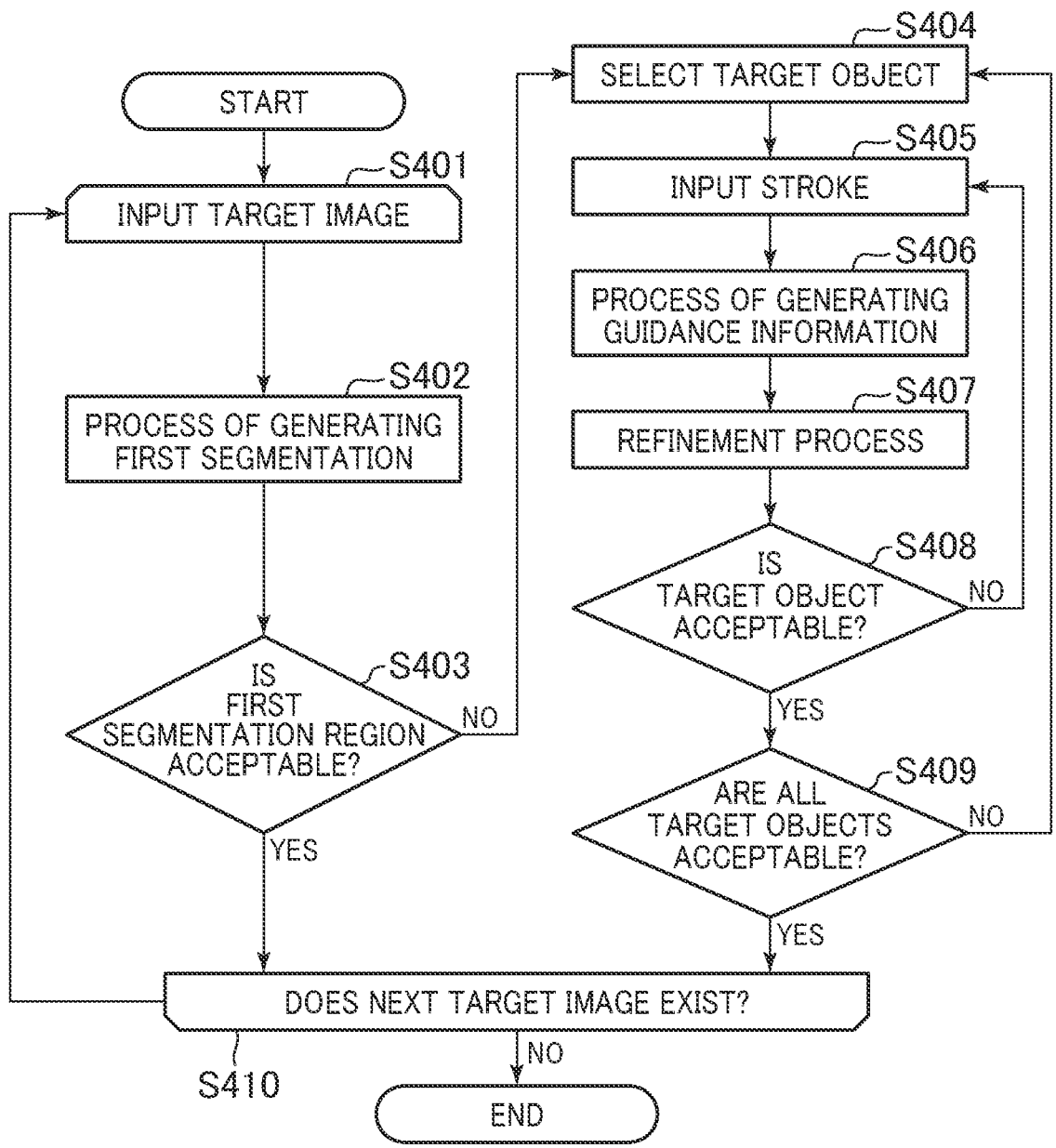
FIG. 4 is a flowchart depicting an example of the real-time object segmentation process according to the invention.

When the first segmentation region presented in the automatic window 901 is not a segmentation region desired by the user (NO in step S403 depicted in FIG. 4), the user selects an object to be edited (NO in step S404 depicted in FIG. 4), and inputs a stroke to edit an object mask of the object (in step S405 depicted in FIG. 4).

For example, when a pointing device used by the user is a mouse, the user may left-click the mouse to draw the object mask and may right-click the mouse to delete the object mask.

Subsequently, a second segmentation region is generated (in steps S406 and S407 depicted in FIG. 4) by the foregoing process based on the user's input and displayed in the image editing window 902. As described above, while inputting the stroke to refine the first segmentation region, the user can confirm the feedback based on the input performed for the refinement in real time.

Next, a user interface 1000 to be used to execute the real-time object segmentation according to the invention is described with reference to FIG. 11. The user interface 1000 is, for example, a GUI to be used to perform an operation of organizing image layers (foreground and background) and an operation of segmenting an object in the image editing program.

As depicted in FIG. 11, the user interface 1000 includes an automatic window 1001, a region display window 1003, and a setting window 1006.

In an image depicted in FIG. 11, a first segmentation region 1002 in which object masks of two persons are mixed into a single object mask is displayed in the automatic window 1001. Since the first segmentation region 1002 is not a segmentation region desired by the user, the user inputs a stroke to segment the mixed objects.

For example, the user may select a process (instance cut 1010 in this case) desired to be performed from among foreground cut 1008, background cut 1009, and instance cut 1010, select a desired size of refinement brush 1007, and use the brush to input the stroke.

The mixed single object mask in the first segmentation region is segmented into two independent object masks 1004 and 1005 by the foregoing process based on the input of the stroke, and the object masks 1004 and 1005 are displayed as a second segmentation region. Thus, while inputting the stroke to refine the first segmentation region, the user can confirm the feedback based on the input for the refinement in real time.

As described above, the image object segmenting unit (for example, the image object segmenting unit 202) and the refining unit (for example, the refining unit 205) that are included in the real-time object segmentation system according to the invention may be enabled as a machine learning-enabled model such as an encoder-decoder network. Thus, the accuracy of the image object segmentation can be improved by training the image object segmenting unit and the refining unit via an iterative training method for machine learning.

Next, an object segmentation training system 1100 according to the invention is described with reference to FIG. 12. Since the training system depicted in FIG. 12 is substantially the same as the real-time object segmentation system described using FIG. 2, a description of the same constituent elements is omitted and different elements are mainly described below.

Figure 12:
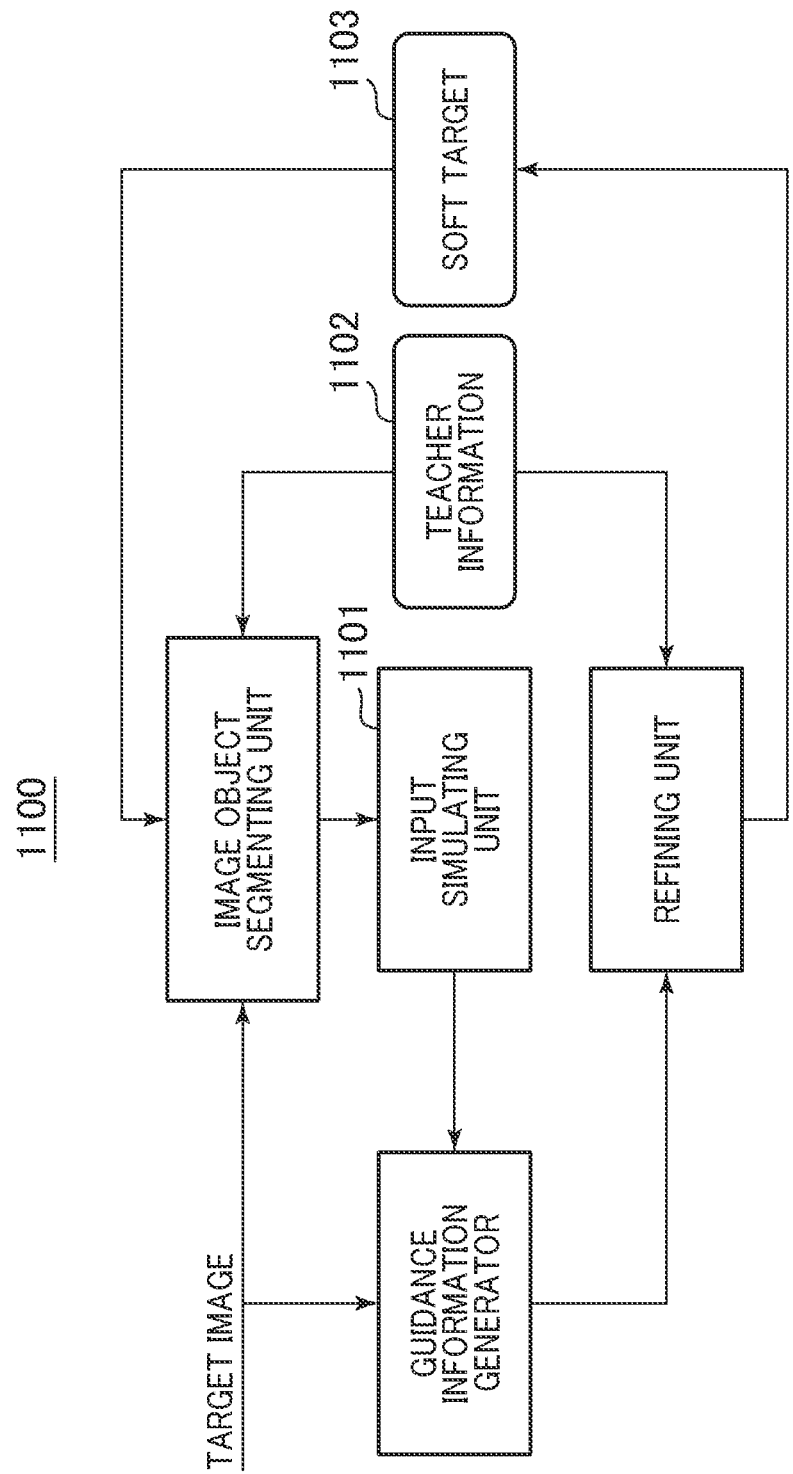
FIG. 12 is a diagram depicting an example of a real-time object segmentation training system according to the invention.

The object segmentation training system 1100 depicted in FIG. 12 is different from the object segmentation system 200 depicted in FIG. 2 in that the object segmentation training system. 1100 includes an input simulating unit 1101, instead of the user interface. The input simulating unit 1101 is a functional unit that automatically generates user's input (or a stroke to refine a segmentation region) to a target image. For example, as depicted in FIG. 12 described later, the input simulating unit 1101 may generate a stroke extending from a start point on an object mask of an object in the target image.

A segmentation region based on information of simulation by the input simulating unit 1101 is generated by the foregoing process. The segmentation region based on the simulation information is a soft target 1103 in a method of training the object segmentation system. The soft target is information to be used as an intermediate result indicating segmentation accuracy of a current network. By comparing the soft target 1103 with teacher information 1102 indicating a segmentation region defined to be "correct", the distance of the segmentation accuracy of the current network from desired segmentation accuracy can be estimated. By iteratively training the network using the result of the comparison as feedback, the accuracy of the image object segmentation can be improved.

Figure 13:
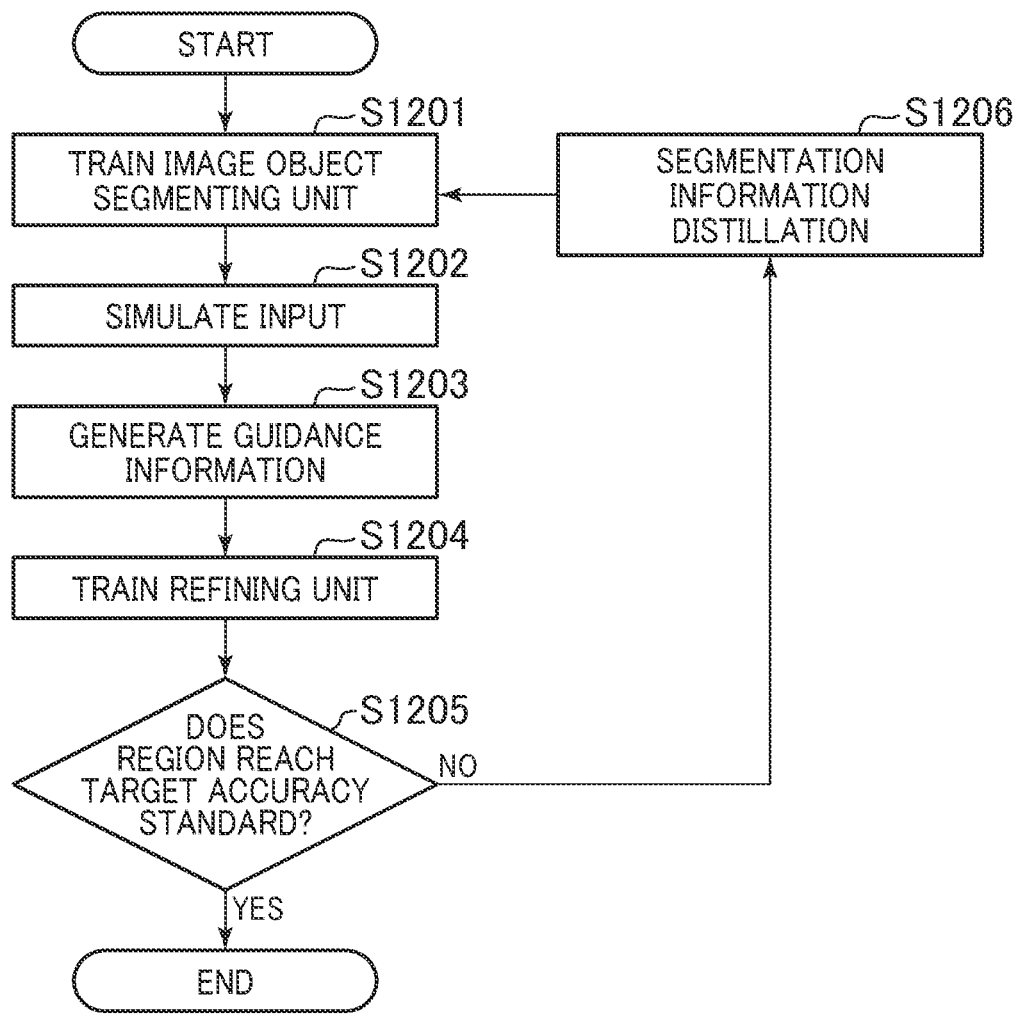
FIG. 13 is a diagram depicting an example of a real-time object segmentation training method according to the invention.

Next, a real-time object segmentation training method 1200 according to the invention is described with reference to FIG. 13.

First, in step S1201, the foregoing image object segmenting unit (for example, the image object segmenting unit depicted in FIG. 12) generates a first segmentation region for a predetermined target image. Subsequently, the image object segmenting unit compares the generated first segmentation region with teacher information indicating the foregoing desired segmentation region and calculates a loss of the first segmentation region with respect to the teacher information. The accuracy of the object segmentation by the image object segmenting unit can be improved by iteratively training the image object segmenting unit using the loss as feedback.

Subsequently, in step S1202, the input simulating unit (for example, the input simulating unit 1101 depicted in FIG. 12) simulates user's input to the first segmentation region generated by the trained image object segmenting unit. A process of simulating the user's input is described later with reference to FIG. 13 and is not described in the description of the method 1200.

Subsequently, in step S1203, the guidance information generator (for example, the guidance information generator depicted in FIG. 12) generates the foregoing guidance information based on the first segmentation information generated by the trained image object segmenting unit and the user's input simulated in step S1202.

Subsequently, in step S1204, the refining unit (for example, the refining unit depicted in FIG. 12) refines the first segmentation region based on the guidance information generated in step S1203 to generate a second segmentation region serving as a soft target in the training method. Then, in the same manner as step S1201, the refining unit compares the second segmentation region with the teacher information indicating the foregoing desired segmentation region and calculates a loss of the second segmentation region with respect to the teacher information. By iteratively training the refining unit using the loss as feedback, the accuracy of the object segmentation by the refining unit can be improved.

Subsequently, in step S1205, it is determined whether the second segmentation region generated by the trained refining unit reaches a predetermined segmentation accuracy criterion. For example, the determination may be made by causing a known image similarity calculation algorithm to calculate a similarity between the second segmentation region and the teacher information indicating the desired segmentation result and compare the calculated similarity with a predetermined target similarity criterion (for example, 90%). When the second segmentation region does not reach the predetermined target similarity criterion, the training method proceeds to step S1206. When the second segmentation region reaches the predetermined target similarity criterion, the training method is terminated.

When it is determined that the second segmentation region does not reach the predetermined target similarity criterion, the image object segmenting unit is retrained based on output of the trained refining unit (training by "segmentation information distillation") in step S1206. Specifically, a loss of a segmentation region of the image object segmenting unit can be calculated by comparing the segmentation region of the image object segmenting unit with a soft target as a segmentation region, generated based on a target image for training, of the refining unit and the teacher information indicating the desired segmentation region. A loss $L_{seg}$ caused by the image object segmenting unit is calculated according to the following Equation 3.

$$L_{seg}(i,\theta)=L_{gt}(i,\theta)+\lambda L_{soft}(i,\theta) \quad \text{(Equation 3)}$$

As expressed by Equation 3, the loss $L_{seg}$ caused by the image object segmenting unit is the sum of a loss $L_{gt}(i, \theta)$ of the segmentation region of the image object segmenting unit with respect to the teacher information and a loss $L_{soft}$ of the segmentation region of the image object segmenting unit with respect to the soft target. In Equation 3, i indicates the target image for training, $\theta$ indicates a parameter to be trained, and $\lambda$ is a predetermined balance coefficient.

By retraining the image object segmenting unit based on output of the trained refining unit, the image object segmenting unit can be finely tuned and the accuracy of the segmentation can be further improved. In addition, the guidance information can be generated based on the segmentation result of the retrained image object segmenting unit, and the refining unit can be retrained. The training of the "segmentation information distillation" may be iteratively executed until the accuracy of the segmentation reaches target segmentation accuracy.

Next, the user's input simulation according to the invention is described with reference to FIG. 14.

As described above, in the object segmentation training method according to the invention, the input simulating unit for automatically simulating user's input is used, instead of user's input. Thus, the image object segmenting unit and the refining unit according to the invention can be automatically executed without user's input.

First, the input simulating unit receives a first segmentation region generated by the image object segmenting unit. Then, the input simulating unit randomly generates start points 1401 of a stroke in the vicinity of a boundary between an object mask of a target object in the first segmentation region and a region that is desired to be included in the object mask or from which the object mask is desired to be removed. After that, the input simulating unit generates many stroke segments 1402 for the generated start points. The number of stroke segments 1402 to be generated and lengths and directions of the stroke segments 1402 to be generated may be arbitrarily defined. By generating a segmentation result based on the randomly generated stroke segments 1402 and executing the iterative training, the accuracy of the segmentation by the image object segmenting unit and the refining unit can be improved.

Next, touch operations in the real-time object segmentation process according to the invention are described with reference to FIG. 15. As described above, user's input may be performed using a pen, a finger, or an arbitrary pointing device such as a mouse in the real-time object segmentation process according to the invention. The case where user's input is performed via a touch operation is described below.

In the case where the user's input is performed via a touch operation, the user can simultaneously input multiple strokes using fingers. In this case, an example in which 3 touch operations, instance segmentation 1501, instance merger 1502, and deletion 1503 are performed is described. Touch operations according to the invention are not limited and another touch operation may be performed.

First, the instance segmentation 1501 is described. The instance segmentation 1501 is a touch operation of segmenting multiple object masks mixed into a single object mask. In the instance segmentation 1501, the user uses two fingers (for example, a thumb and an index finger) to pinch a boundary between the object masks to be segmented and swipe the fingers toward directions in which the two fingers become away from each other, thereby segmenting the single mixed object mask into the two independent object masks.

Next, the instance merger 1502 is described. The instance merger 1502 is a touch operation of merging multiple independent object masks. In the instance merger 1502, the user uses two fingers (for example, the thumb and the index finger) to pinch boundaries of object masks to be merged and swipe the fingers in directions in which the two fingers become close to each other, thereby merging the two independent object masks into a single object mask.

Next, the deletion 1503 is described. The deletion 1503 is an operation of removing an unnecessary region included in an object mask from the object mask. In the deletion 1503, the user uses a single finger (for example, the thumb) to hold down a region to be kept and uses another single finger (for example, the index finger) to trace the unnecessary region, thereby deleting the traced region from the object mask.

The foregoing touch operations are different from input using a mouse, a pen, or the like in that multiple strokes are simultaneously input in the foregoing touch operations. By simultaneously receiving multiple input strokes, a segmentation region can be quickly generated and an effect of improving the accuracy of the segmentation can be obtained, compared to input using a mouse, a pen, or the like.

When multiple strokes are simultaneously input, a method of generating position maps and direction maps is different from that described with reference to FIG. 6. For example, when two strokes are input, an element of a position map that corresponds to a pixel through which any of the strokes passes in an image is set to "1". Values of other elements are calculated according to the foregoing Equation 1. In direction maps, elements corresponding to endpoints of the two strokes are set to "1" and "2", and values of other elements are calculated according to the foregoing Equation 2.

When multiple strokes are simultaneously input, a process by the foregoing "deletion detector" is different from that described above. For example, when two strokes are input, and it is determined that a direction in which a route of any of the strokes extends is substantially opposite to a direction in which a previous stroke route extends, an intention of "deletion" is detected.

The configuration in which the processes according to the invention are enabled in the form of the device, the method, or the system is described above, but the invention is not limited to this. The configuration may be enabled by an electronic circuit or a software program. For example, in an aspect of the invention, an image processing computer program is executed by an image processing device including the guidance information generator and includes a program command, which causes a processor to execute a process of generating a segmentation region desired by a user from trajectory information to be used by the guidance information generator to segment an image object input by the user.

Although the embodiments of the invention are described above, the invention is not limited to the embodiments, and various changes and modification may be made in the embodiments without departing from the gist of the invention.

What is claimed is:

1. An image processing device for segmenting an image object, comprising:
    a guidance information generator that generates a segmentation region desired by a user from trajectory information to be used to segment the image object input by the user,
        wherein the guidance information generator further comprises a deletion detector configured to compare a first segmentation region corresponding to the trajectory information input by the user associated with a first time period and a first direction and including a first region on an image as a region of a first object with a second segmentation region corresponding to the trajectory information input by the user associated with a second time period, that is after the first time period and is equal to or shorter than a predetermined time period, and a second direction, and
        when it is determined that the second segmentation region reaches a predetermined reverse criterion, defined at least as the second direction being opposite of the first direction, a guidance information calculator generates a third segmentation region from which the first region has been removed from the region of the first object.

2. The image processing device according to claim 1, wherein
    the guidance information generator is configured to
    detect a stroke input on the image object on the image, and
    extract, as the trajectory information, position information and direction information that correspond to a stroke segment that has been input for a certain time period and is a part of the stroke.

3. The image processing device according to claim 2, wherein
    the guidance information generator includes a trajectory transformer and a recurrent neural network ("RNN") characteristic extractor,
    the trajectory transformer is configured to
    calculate, from the position information indicated in the trajectory information, a position map indicating a route through which the stroke segment has passed on the image, and
    calculate, from the direction information indicated in the trajectory information, a direction map indicating a direction in which the route through which the stroke segment has passed on the image extends, and
    the RNN characteristic extractor is configured to
    generate an intention map indicating, for each of pixels within the image, a probability with which the stroke passes through the pixel, based on the image, the direction map, and the position map.

4. The image processing device according to claim 3, wherein
    the guidance information generator further includes a refining unit,
    the guidance information calculator is configured to
    calculate the segmentation region based on the image and the intention map, and
    the refining unit is configured to
    generate a final image indicating the segmentation region and present the generated final image to the user.

5. The image processing device according to claim 1, further comprising:
    a user interface, wherein the guidance information generator includes a trajectory transformer, a recurrent neural network ("RNN") characteristic extractor, and a refining unit, the guidance information generator is configured to detect a stroke input on the image object on the image via the user interface, and detect, as the trajectory information, position information and direction information that correspond to a stroke segment that has been input for a certain time period and is a part of the stroke, the trajectory transformer is configured to calculate, from the position information indicated in the trajectory information, a position map indicating a route through which the stroke segment has passed on the image, and calculate, from the direction information indicated in the trajectory information, a direction map indicating a direction in which the route through which the stroke segment has passed on the image extends, the RNN characteristic extractor is configured to generate an intention map indicating, for each of pixels within the image, a probability with which the stroke passes through the pixel, based on the image, the direction map, and the position map, the guidance information calculator is configured to calculate the segmentation region based on the image and the intention map, and the refining unit is configured to generate a final image indicating the image and the segmentation region and present the final image to the user via the user interface.

6. An image processing method to be executed by an image processing device for segmenting an image object, wherein the image processing device includes a user interface and a guidance information generator, and the image processing method comprises:

detecting an input stroke on an image displayed on the user interface;

extracting trajectory information corresponding to a stroke segment that has been input for a certain time period and is a part of the stroke;

generating a final image indicating a segmentation region based on the trajectory information;

presenting the final image on the user interface; and comparing a first segmentation region corresponding to the trajectory information associated with a first time period and a first direction and including a first region on the image as a region of a first object with a second segmentation region corresponding to the trajectory information associated with a second time period, that is after the first time period and is equal to or shorter than a predetermined time period, and a second direction, and when it is determined that the second segmentation region reaches a predetermined reverse criterion, defined at least as the second direction being opposite of the first direction, a guidance information calculator generates a third segmentation region from which the first region has been removed from the region of the first object.

7. The image processing method according to claim 6, wherein the image processing device further includes a guidance information generator, the guidance information generator includes a trajectory transformer and a recurrent neural network ("RNN") characteristic extractor, the trajectory information includes position information and direction information, and the generating the final image includes causing the trajectory transformer to calculate, from the position information included in the trajectory information, a position map indicating a route through which the stroke segment has passed on the image, causing the trajectory transformer to calculate, from the direction information included in the trajectory information, a direction map indicating a direction in which the route through which the stroke segment has passed on the image extends, and causing the RNN characteristic extractor to generate an intention map indicating, for each of pixels within the image, a probability with which the stroke passes through the pixel, based on the image, the direction map, and the position map.

8. An image processing system for segmenting an image object, comprising:

an image processing device; and a client terminal, wherein the image processing device and the client terminal are connected to each other via a communication network, the image processing device includes a guidance information generator wherein the guidance information generator further comprises a guidance information calculator and a deletion detector, and the guidance information generator is configured to receive, from the client terminal, an image and stroke information on a stroke input on the image object on the image, calculate trajectory information indicating a trajectory of the stroke based on the stroke information, and generate a segmentation region desired by a user from the trajectory information and transmit the generated segmentation region to the client terminal, and the deletion detector is configured to compare a first segmentation region corresponding to the trajectory information a first time period and a first direction and including a first region on the image as a region of a first object with a second segmentation region corresponding to the trajectory information a second time period, that is after the first time period and is equal to or shorter than a predetermined time period, and a second direction, and when it is determined that the second segmentation region reaches a predetermined reverse criterion, defined at least as the second direction being opposite of the first direction, the guidance information calculator generates a third segmentation region from which the first region has been removed from the region of the first object.

9. The image processing system according to claim 8, wherein the guidance information generator is configured to calculate the trajectory information by extracting position information and direction information that correspond to a stroke segment that has been input for a certain time period and is a part of the stroke corresponding to the stroke information.

10. The image processing system according to claim 9, wherein the guidance information generator includes a trajectory transformer and a recurrent neural network ("RNN") characteristic extractor, the trajectory transformer is configured to calculate, from the position information indicated in the trajectory information, a position map indicating a route through which the stroke segment has passed on the image, and calculate, from the direction information indicated in the trajectory information, a direction map indicating a direction in which the route through which the stroke segment has passed on the image extends, and the RNN characteristic extractor is configured to generate an intention map indicating, for each of pixels within the image, a probability with which the stroke passes the pixel, based on the image, the direction map, and the position map.

\* \* \* \* \*